US006993656B1

(12) United States Patent
Peyravian et al.

(10) Patent No.: US 6,993,656 B1
(45) Date of Patent: Jan. 31, 2006

(54) TIME STAMPING METHOD USING AGED TIME STAMP RECEIPTS

(75) Inventors: Mohammad Peyravian, Cary, NC (US); Allen Roginsky, Durham, NC (US); Nevenko Zunic, Wappingers Falls, NY (US); Stephen M. Matyas, Jr., Manassas, VA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/458,928

(22) Filed: Dec. 10, 1999

(51) Int. Cl.
*H04L 9/00* (2006.01)

(52) U.S. Cl. .................. 713/178; 713/170; 713/181

(58) Field of Classification Search ................ 713/155, 713/178, 176, 179, 158, 170, 181, 501, 502; 705/60, 75, 50, 51
See application file for complete search history.

(56) References Cited

U.S. PATENT DOCUMENTS

| | | | |
|---|---|---|---|
| 5,001,752 A | | 3/1991 | Fischer |
| 5,136,646 A | | 8/1992 | Haber et al. |
| 5,136,647 A | * | 8/1992 | Haber et al. ................. 713/178 |
| 5,189,700 A | * | 2/1993 | Blandford ................... 713/178 |
| 5,373,561 A | | 12/1994 | Haber et al. |
| RE34,954 E | | 5/1995 | Haber et al. |
| 5,471,631 A | * | 11/1995 | Beardsley et al. .......... 713/502 |
| 5,638,443 A | * | 6/1997 | Stefik et al. .................. 705/54 |
| 5,781,629 A | | 7/1998 | Haber et al. |
| 6,209,090 B1 | * | 3/2001 | Aisenberg et al. .......... 713/178 |
| 6,381,696 B1 | * | 4/2002 | Doyle ......................... 713/156 |
| 6,393,566 B1 | * | 5/2002 | Levine ........................ 713/178 |
| 6,530,023 B1 | * | 3/2003 | Nissl et al. .................. 713/200 |
| 6,574,627 B1 | * | 6/2003 | Bergadano et al. ............. 707/9 |
| 2001/0011350 A1 | * | 8/2001 | Zabetian ..................... 713/176 |

FOREIGN PATENT DOCUMENTS

WO     WO 99/16209     4/1999

OTHER PUBLICATIONS

Stuart Haber et al, How to Time-Stamp a Digital Document, Aug. 1990, Advances in Cryptology—CRYPTO '90 Proceedings, p. 437-455.*
Akira Takura et al, A Secure and Trusted Time Stamping Authority, 1999, IEEE, p. 88-93.*
Bruce Schneier, Applied Cryptography, 1996, John Wiley & Sons, Inc., Second Edition, p. 455-459.*

* cited by examiner

*Primary Examiner*—Hosuk Song
*Assistant Examiner*—Beemnet W Dada
(74) *Attorney, Agent, or Firm*—Coats & Bennett, P.L.L.C.

(57) ABSTRACT

A method for time stamping a digital document is disclosed. The document originator creates a time stamp receipt by combining the document or other identifying data and a digital time indication. The time stamp receipt is submitted to a time stamping authority having a trusted clock. The time stamping authority optionally validates the time stamp receipt and then computes the age of the time stamp receipt. The time stamping authority creates an aged time stamp receipt by combining the identifying data and time indication contained in the submitted time stamp receipt with the computed age of the time stamp receipt. The time stamping authority cryptographically binds the time information and identifying data in the aged time stamp receipt, e.g., by signing the combination of the identifying data, time indication, and computed age with a private signature generation key.

26 Claims, 1 Drawing Sheet

TIME STAMPING METHOD USING AGED TIME STAMP RECEIPTS

BACKGROUND OF THE INVENTION

The present invention relates generally to cryptographic protocols and, more particularly, to a time-stamping protocol for time-stamping digital documents.

There are times when it is desirable to prove the existence of a document as of a particular date. For example, patent disputes concerning the inventorship of an invention often turn on who is able to produce corroborating documentary evidence dating their conception of the invention. A common procedure for dating records is to keep the records in a daily journal or notebook with each page sequentially numbered and dated. Another procedure for dating a record is to have the record witnessed by an uninterested or trusted party that can attest to the existence of the document. The increasing use of computers, however, makes these time-stamping methods obsolete. It is relatively easy to change the date-stamp added to a document by the computer when the document was created. Further, while it is difficult to alter a paper document without leaving some signs of tampering, digital records can be easily altered or revised without leaving any evidence of tampering. Therefore, people are less likely to trust a digital document than a paper document that has been time-stamped using conventional time-stamping procedures.

To be trusted, a time-stamping procedure for digital documents should meet the following criteria:

1. The data itself must be time-stamped, without any regard to the physical medium on which it resides.
2. It must be impossible to change a single bit of the data without that change being apparent.
3. It must be impossible to timestamp a document with a date and time different than the current date and time.

One method for time-stamping a digital document would be to archive the document with a trusted escrow agent. In this case, the document originator sends a copy of the digital document to a trusted escrow agent. The escrow agent records the date and time that the document was received and retains a copy in his archives. Later, if a dispute arises over the date of the document, the document originator can contact the escrow agent who produces his copy of the document and verifies that it was received on a particular date. This time-stamping procedure has a number of drawbacks. First, the document originator must disclose the contents of the document to the escrow agent. Also, large documents take a relatively long period of time to transmit to the escrow agent and they require a large amount of data storage.

An improvement of the escrow procedure is to use a hash of the document. Instead of sending the document to the escrow agent, the document originator hashes the document using a one-way hash algorithm and sends the generated hash value to the escrow agent. The escrow agent stores the hash value along with the date and time that it was received in his archives. Later the document originator can use the services of the escrow agent to prove the existence of the document as of a particular date. The disputed document can be hashed and the resulting hash value can be compared to the hash value stored by the escrow agent in his archives for equality. If the hash values are equal, the document is presumed to be in existence as of the date associated with the stored hash value. One advantage of this method is that the document originator does not need to disclose the contents of the document to the escrow agent.

The need to escrow the document or hash value can be eliminated by having a time stamping authority generate a certified time stamp record using a cryptographic signature scheme as taught in U.S. Pat. No. Re. 34,954 to Haber et al. and Fischer, U.S. Pat. No. 5,001,752. In this case, the document originator hashes the document and transmits the hash value to the time stamping authority. The time stamping authority appends the current date and time to the hash value to create a time stamp record and digitally signs the time stamp record with a private signature key. The time stamping authority's public verification key is distributed and available to anyone interested in validating a time stamp record created by time stamping authority. The public verification key is typically stored in a public key certificate signed by a Certification Authority so that anyone desiring to validate the time stamp record with the public key can have confidence in the authenticity of the key.

SUMMARY OF THE INVENTION

The present invention is a time-stamping protocol for time-stamping digital documents so that the date of the document can be verified. The method presumes the existence of a trusted agent referred to herein as the time-stamping authority (TSA). According to the present invention, the document originator creates a time stamp receipt by combining the document or other identifying data that can later serve as evidence of the substance of the document with a time indication. The document originator sends the time stamp receipt to a time stamping authority TSA. After validating the time stamp receipt received from the document originator, the time stamping agent computes the age of the time stamp receipt R and uses the computed age to create an aged time stamp receipt. The TSA then cryptographically binds together the time information in the aged time stamp receipt with the document, or representation of the document, in the aged time stamp receipt, e.g., by certifying the aged time stamp receipt using a cryptographic signature scheme. The generated binding information is transmitted back to the document originator or to a party designated by the document originator.

DETAILED DESCRIPTION OF THE INVENTION

Figure 1:
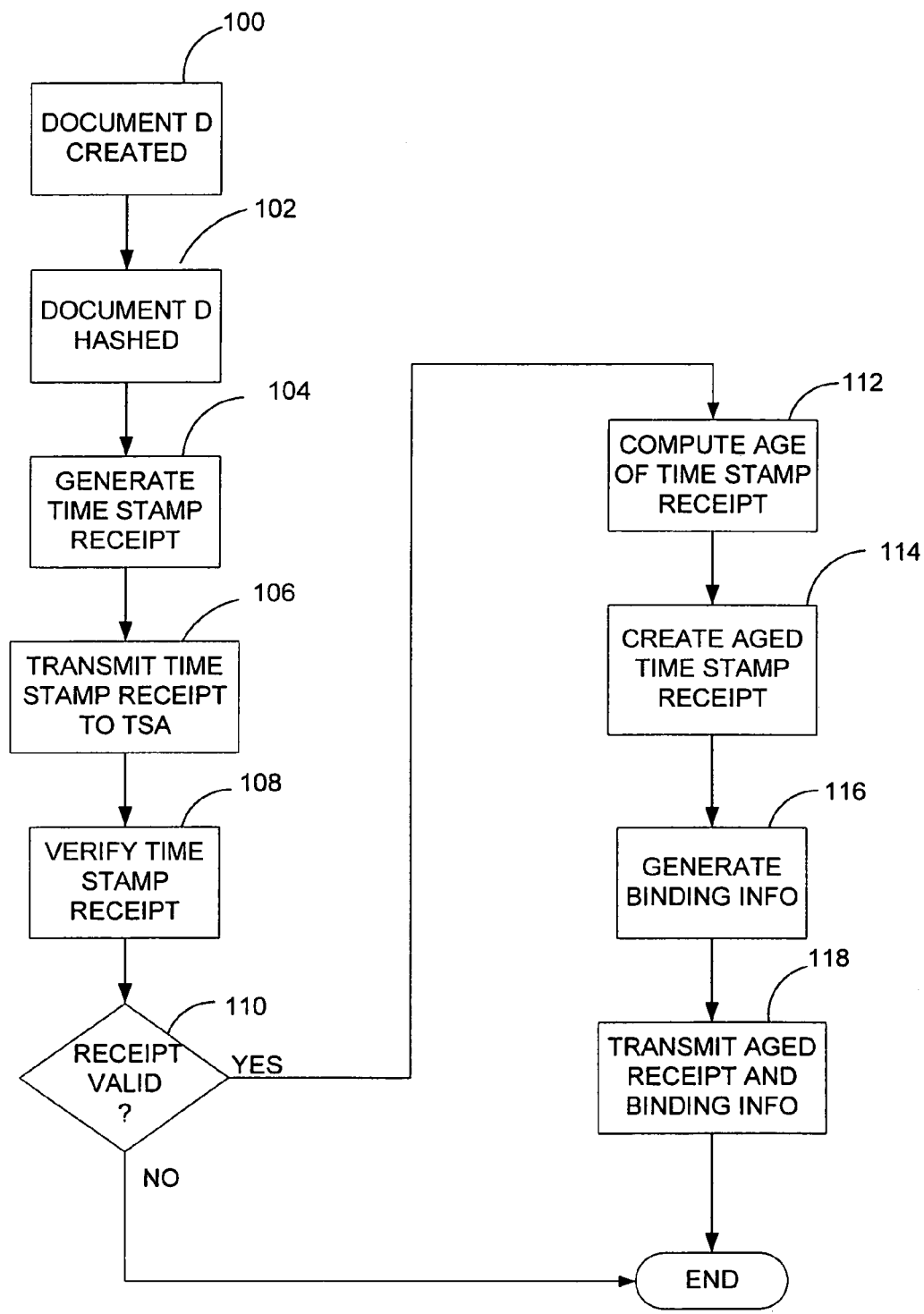
FIG. 1 illustrates an illustrative embodiment of the time stamping method of the present invention.

FIG. 1 is a flow diagram illustrating the general process of time-stamping a document according to the present invention. A document D is created at step 100. The document D is presumed to be in digital form and may comprise any alphanumeric, audio, or graphic presentation of any length. The document D may optionally be hashed at step 102 using a one-way hashing function. A hash function is a function that takes a variable length input string, called a pre-image, and converts it to a fixed-length string, called a hash value, denoted H. The pre-image in this case is the document D or selected portions thereof. A one-way hash function operates in only one direction. While, it is easy to compute a hash value from the pre-image, it is computationally impractical to find a pre-image that hashes to a given hash value. Thus, it is practically impossible to recover the pre-image given the hash value and knowledge of the hash algorithm. Another feature of a hashing function is that it is difficult to find any two pre-images that hash to the same value.

There are several advantages to sending a hash value H produced on document D instead of the document D itself. First, the hash value H improves security by functioning as a fingerprint of the document D. Changing a single bit in the document D will result in an entirely different hash value making it easy to detect efforts to modify a document D or hash value H. Second, the hash value H greatly reduces the amount of data that must be transmitted to the TSA. This factor can be important where the available bandwidth is limited. Third, by sending a hash value H in place of the document D, the content of the document D does not need to be disclosed to the TSA.

Any known hashing function, such as the SHA-1, MD5, and RIPEMD-160, can be used in the present invention. For the remaining description of the time stamping protocol, it will be assumed that the document D has been hashed and that the hash value H has been sent to the TSA in lieu of the document D. It is understood, however, that one can practice the invention by substituting D, selected portions of document D, or some other function of D in place of the hash value H in the protocol.

The document originator generates a time stamp receipt R at step 104 by concatenating or otherwise combining identifying data associated with the document D with a time indication. The identifying data may be any digital data derived from or associated with the document D that can be used to identify the document D and may include a digital representation of the document D or selected portions thereof, or a digital sequence derived by application of some function (e.g. hash function) to the document D. In the disclosed embodiment, the identifying data comprises the hash value H generated on document D. Other optional data, such as the originator's identification number ID or a sequential record number SN, could also be used to generate the time stamp receipt R. The optional data could be provided by the document originator or by another party, such as the TSA. The time stamp receipt R is generated, for example, by concatenating the hash value H generated on document D with the current time T and optionally other data, such as the originator's ID number and/or a sequential record number SN. The time stamp receipt R would, in this example, comprise the string (H, T, ID, SN).

After creating the time stamp receipt R, the document originator transmits the time stamp receipt R and other optional data to a time stamping authority TSA at step 106. After receiving the time stamp receipt R, the TSA verifies at step 108 that the data contained in the time stamp receipt R is consistent with data maintained and controlled by the TSA. For example, the TSA may require, as part of its time stamping services, that the document originator provide its ID number and a sequential record number SN. In this case, the TSA would verify that the data submitted by the document originator is consistent with data maintained by the TSA. If, for example, the sequential record number SN was out of sequence, the TSA may refuse to perform the binding operation as described below.

If the time stamp receipt R submitted by the document originator is determined to be valid at step 110, the TSA computes the age of the time stamp receipt R at step 112. The age (A) of the time stamp receipt R is determined by computing the difference between the time that it was received by the TSA ($T_{TSA}$) and the time value (T) specified in the time stamp receipt R, i.e., $A=T_{TSA}-T$. The TSA maintains a trusted clock for purposes of determining the current time, which is used in computing the age of the time stamp receipt. Alternatively, the TSA could obtain the current time from a trusted source. After computing the age of the time stamp receipt R at step 112, the TSA creates an aged time stamp receipt $R_A$ at step 114 by combining the computed age with the received time stamp receipt R. In this case the aged time stamp receipt $R_A$ would comprise the string (A,R). Alternatively, the computed age could be combined with the time value T and identifying data, such as the hash value H, contained in the time stamp receipt R excluding other data in the received time stamp receipt R. In this case, the aged time stamp receipt might comprise the string (A,T,H). The time value T contained in the original time stamp receipt R and the age value A added by the TSA together serve as a time stamp establishing the date and time of the document. That is, the time at which the time stamp receipt R was originally received by the TSA (denoted $T_{TSA}$) is recomputed as $T_{TSA}=T+A$.

After creating an aged time stamp receipt at step 114, the TSA next cryptographically binds the time information (i.e. the time value T and age value A) with the identifying data contained in the time stamp receipt R at step 116. In one exemplary embodiment of the invention, the binding operation is performed by signing the aged time stamp receipt $R_A$ using a private signature generation key. The signature generation key $K_{PR}$ used to perform the binding operation is part of a public and private key pair ($K_P$, $K_{PR}$) used by the TSA to certify time stamp records. The private key $K_{PR}$ is known only to the TSA. The public key $K_P$ is made available to the public so that anyone can verify or authenticate the TSA's signature. The public key $K_P$ can be stored in a certificate signed by a Certification Authority CA so that the TSA's public key can be validated and, hence, trusted by those using the public key $K_P$. The aged time stamp receipt $R_A$ can be signed using any known cryptographic signature scheme, such as a digital cryptographic signature scheme based on the RSA Algorithm.

Those skilled in the art will appreciate that there are numerous other ways to perform the binding operation. Signing the aged time stamp receipt $R_A$ with a signature generation key belonging to the TSA is just one way of binding the time value T, age value A, and identifying data. The binding operation could also be accomplished by computing a Message Authentication Code (MAC) on the computed age A and the time stamp receipt R (or selected portions of R) using a secret key K belonging to the TSA. One method for binding a time value with a document D using a Message Authentication Code is described in a separate application file simultaneously with this application entitled 'Time Stamping Method Employing Separate Ticket and Stub,' which is incorporated herein by reference. The binding operation might also be accomplished by encrypting the time stamp receipt R or selected portions of R and the computed age A using a cryptographic key belonging to the TSA. Another way to perform the binding operation is to compute a hash value on the time receipt R or selected portions of R and the computed age A. In this case, measures would need to be taken to ensure the integrity of the computed hash values. These examples are not intended to be exhaustive, but are intended to illustrate some of the techniques that could be used to perform the binding operation. All that is required is that the binding operation establish a verifiable link between the computed age A, time value T, and the document D or some function of the document D.

The binding operation produces binding information, denoted $B_{INFO}$, which is transmitted to the originator at step 118 along with the aged time stamp receipt $R_A$. If desired, the TSA may store a copy of the aged time stamp receipt, or some function of the aged time stamp receipt, e.g., sig($R_A$), to improve security against deception. If the binding operation is performed by signing the aged time stamp receipt ($R_A$), then the binding information $B_{INFO}$ consists of a digital signature generated on the aged time stamp receipt, denoted sig($R_A$). If the binding operation comprises generation of the Message Authentication Code, encryption value, hash value, or some other function, then the binding information $B_{INFO}$ would comprise the Message Authentication Code, encrypted value, hash value, or other data generated. The binding information could, in this case be simply appended to the aged time stamp receipt $R_A$.

In the event that a dispute arises concerning the validity of a document, the existence and substance of the document can be proved by means of the binding information $B_{INFO}$. For example, consider the situation where $B_{INFO}$ consists of a certified time stamp receipt sig($R_A$). To verify the document D, the TSA's signature on the certified aged time stamp receipt sig($R_A$) is verified using the TSA's public verification key $K_P$. Next, the disputed document D is verified against the hash value H contained in the time stamp receipt R by generating a hash value H on the disputed document D and comparing the computed hash value H to the hash value contained in the time stamp receipt R for equality. The date or time ($T_{TSA}$) of the document D is proved by adding the age A and time value T in the aged time stamp receipt $R_A$, i.e., $T_{TSA}=A+T$.

Where the binding information comprises a Message Authentication code, encrypted value, or other data protected by a secret key, the document originator would need to obtain the aid of the TSA or a third party having access to the secret key to verify the document.

The time-stamping procedures described herein may be implemented using general purpose programmable computers. A client program running on a user's computer could perform the steps of hashing documents, generating time stamp receipts, and transmitting time stamp receipts to the TSA. A server application running on a general purpose programmable computer controlled by the TSA could perform the steps of validating time stamp receipts, binding (e.g., signing time stamp receipts), and transmitting binding information (e.g., signed time stamp receipts) to users. It would also be possible to implement some or all of the steps in firmware, or in hard-wired logic.

The present invention may, of course, be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A computer-implemented method for time stamping a document comprising:
   receiving a time stamp receipt at an outside agency, said time stamp receipt including identifying data associated with said document and a time indication;
   computing the age of said time stamp receipt based on said time indication;
   creating an aged time stamp receipt at said outside agency by combining said identifying data, said time indication and said computed age; and
   binding at said outside agency said identifying data, said time indication, and a digital representation of said age using a cryptographic binding scheme to create an aged time stamp receipt.

2. The time stamping method of claim 1 further including transmitting said aged time stamp receipt and binding information generated during said binding operation to a designated party.

3. The time stamping method of claim 1 wherein said identifying data comprises a digital representation of at least a portion of said document.

4. The time stamping method of claim 3 wherein said identifying data comprises a digital sequence derived by application of a deterministic function to at least a portion of said document.

5. The time stamping method of claim 4 wherein said digital sequence is a hash value derived by application of a one-way hashing function to at least a portion of said document.

6. The time stamping method of claim 1 wherein said time stamp receipt further includes an identification number associated with the document originator.

7. The time stamping method of claim 6 wherein said time stamp receipt further includes a sequential record number.

8. The time stamping method of claim 7 further including the step of validating said time stamp receipt at said outside agency.

9. The time stamping method of claim 8 wherein the step of validating said time stamp receipt includes comparing said identification number and sequential record number with data maintained by the outside agency.

10. The time stamping method of claim 1 wherein said binding step includes signing a combination of said identifying data, said time indication, and said digital representation of said age using a digital cryptographic signature scheme.

11. The time stamping method of claim 1 wherein said binding step includes computing a message authentication code on a combination of said identifying data, said time indication, and said digital representation of said age using a secret key controlled by said outside agency.

12. The time stamping method of claim 1 wherein said binding step includes computing a hash value on a combination of said identifying data, said time indication, and said digital representation of said age.

13. The time stamping method of claim 1 wherein said binding step includes encrypting a combination of said identifying data, said time indication, and said digital representation of said age using a secret key controlled by said outside agency.

14. A computer-implemented method for time stamping a document comprising:
   creating a time stamp receipt including identifying data associated with said document and a time indication;
   transmitting said time stamp receipt to an outside agency for certification;
   computing the age of said time stamp receipt at said outside agency;
   creating an aged time stamp receipt at said outside agency by combining said identifying data, said time indication and said computed age; and
   binding at said outside agency said identifying data, said time indication, and a digital representation of said age using a cryptographic binding scheme to create an aged time stamp receipt.

15. The time stamping method of claim 14 further including transmitting said aged time stamp receipt and binding information generated during said binding operation to a designated party.

16. The time stamping method of claim 14 wherein said identifying data comprises a digital representation of at least a portion of said document.

17. The time stamping method of claim 16 wherein said identifying data comprises a digital sequence derived by application of a deterministic function to at least a portion of said document.

18. The time stamping method of claim 17 wherein said digital sequence is a hash value derived by application of a one-way hashing function to at least a portion of said document.

19. The time stamping method of claim 14 wherein said time stamp receipt further includes an identification number associated with the document originator.

20. The time stamping method of claim 19 wherein said time stamp receipt further includes a sequential record number.

21. The time stamping method of claim 20 further including the step of validating said time stamp receipt at said outside agency.

22. The time stamping method of claim 21 wherein the step of validating said time stamp receipt includes comparing said identification number and sequential record number with data maintained by the outside agency.

23. The time stamping method of claim 14 wherein said binding step includes signing a combination of said identifying data, said time indication, and said digital representation of said age using a digital cryptographic signature scheme.

24. The time stamping method of claim 14 wherein said binding step includes computing a message authentication code on a combination of said identifying data, said time indication, and said digital representation of said age using a secret key controlled by said outside agency.

25. The time stamping method of claim 14 wherein said binding step includes computing a hash value on a combination of said identifying data, said time indication, and said digital representation of said age.

26. The time stamping method of claim 14 wherein said binding step includes encrypting a combination of said identifying data, said time indication, and said digital representation of said age using a secret key controlled by said outside agency.

* * * * *